(12) United States Patent
Hreha

(10) Patent No.: US 11,235,859 B2
(45) Date of Patent: Feb. 1, 2022

(54) METHODS AND APPARATUS FOR ENHANCING AIRCRAFT FLIGHT CONTROL SURFACE EFFECTIVENESS VIA FORCED OSCILLATION

(71) Applicant: The Boeing Company, Chicago, IL (US)

(72) Inventor: Mark A. Hreha, Alton, IL (US)

(73) Assignee: THE BOEING COMPANY, Chicago, IL (US)

( * ) Notice: Subject to any disclaimer, the term of this patent is extended or adjusted under 35 U.S.C. 154(b) by 285 days.

(21) Appl. No.: 16/689,812

(22) Filed: Nov. 20, 2019

(65) Prior Publication Data

US 2021/0147066 A1 May 20, 2021

(51) Int. Cl.
*B64C 13/00* (2006.01)
*B64C 13/16* (2006.01)
*B64D 45/00* (2006.01)
*G05D 1/08* (2006.01)

(52) U.S. Cl.
CPC .......... *B64C 13/16* (2013.01); *B64D 45/0005* (2013.01); *G05D 1/0816* (2013.01)

(58) Field of Classification Search
CPC ....... B64C 13/16; B64C 13/506; B64C 21/00; B64C 13/503; B64D 45/0005; G05D 1/0816; G06F 3/016; G06F 30/00; G06F 30/36; G06F 30/367; G06F 3/011; G06F 3/03; H02P 23/0022; H02P 25/032
See application file for complete search history.

(56) References Cited

U.S. PATENT DOCUMENTS 10,432,125 B2 * 10/2019 Feng ........................ G06F 30/36

* cited by examiner

*Primary Examiner* — Ian Jen
(74) *Attorney, Agent, or Firm* — Hanley, Flight & Zimmerman, LLC

(57) ABSTRACT

Methods and apparatus for enhancing aircraft flight control surface effectiveness via forced oscillation are described. An example control system of an aircraft includes a flight control surface, an actuator, and one or more processors. The actuator is configured to move the flight control surface. The one or more processors are configured to determine a current position of the flight control surface. The one or more processors are further configured to determine whether the current position exceeds a position threshold. The one or more processors are further configured to generate a forced oscillation signal in response to determining that the current position exceeds the position threshold. The one or more processors are further configured to command the actuator to move the flight control surface based on the forced oscillation signal.

20 Claims, 7 Drawing Sheets

METHODS AND APPARATUS FOR ENHANCING AIRCRAFT FLIGHT CONTROL SURFACE EFFECTIVENESS VIA FORCED OSCILLATION

FIELD OF THE DISCLOSURE

This disclosure relates generally to aircraft flight control surfaces and, more specifically, to methods and apparatus for enhancing aircraft flight control surface effectiveness via forced oscillation.

BACKGROUND

The wings and/or the stabilizers of an aircraft commonly include flight control surfaces (e.g., ailerons, flaperons, elevators, stabilators, rudders, etc.) configured to control the pitch, the roll, and/or the yaw of the aircraft during flight. Each flight control surface is typically movable from a neutral (e.g., undeflected) position through a range of deflected positions (e.g., a range of positive and/or negative deflected positions) that enable the flight control surface to provide a desired aerodynamic effect associated with controlling the pitch, the roll, and/or the yaw of the aircraft.

In conventional implementations, the aerodynamic effectiveness of each flight control surface of an aircraft typically decreases near the boundaries and/or extremes of the deflection range of the flight control surface. Reduction of flight control surface effectiveness is caused by local airflow separation that occurs as the angle of the flight control surface relative to the direction of the local airflow increases. Such reduction of flight control surface effectiveness can adversely limit the maneuverability of the aircraft in pitch, roll, and/or yaw.

SUMMARY

Example methods and apparatus for enhancing aircraft flight control surface effectiveness via forced oscillation are disclosed. In some examples, a control system of an aircraft is disclosed. In some disclosed examples, the control system includes a flight control surface, an actuator, and one or more processors. In some disclosed examples, the actuator is configured to move the flight control surface. In some disclosed examples, the one or more processors are configured to determine a current position of the flight control surface. In some disclosed examples, the one or more processors are further configured to determine whether the current position exceeds a position threshold. In some disclosed examples, the one or more processors are further configured to generate a forced oscillation signal in response to determining that the current position exceeds the position threshold. In some disclosed examples, the one or more processors are further configured to command the actuator to move the flight control surface based on the forced oscillation signal.

In some examples, a method is disclosed. In some disclosed examples, the method comprises determining, by executing a machine-readable instruction with one or more processors of an aircraft, a current position of a flight control surface of the aircraft. In some disclosed examples, the method further comprises determining, by executing a machine-readable instruction with the one or more processors, whether the current position exceeds a position threshold. In some disclosed examples, the method further comprises generating, by executing a machine-readable instruction with the one or more processors, a forced oscillation signal in response to determining that the current position exceeds the position threshold. In some disclosed examples, the method further comprises commanding, by executing a machine-readable instruction with the one or more processors, an actuator coupled to the flight control surface to move the flight control surface based on the forced oscillation signal.

In some examples, a non-transitory computer-readable storage medium comprising instructions is disclosed. In some disclosed examples, the instructions, when executed, cause one or more processors of a machine to determine a current position of a flight control surface of an aircraft. In some disclosed examples, the instructions, when executed, cause the one or more processors to determine whether the current position exceeds a position threshold. In some disclosed examples, the instructions, when executed, cause the one or more processors to generate a forced oscillation signal in response to determining that the current position exceeds the position threshold. In some disclosed examples, the instructions, when executed, cause the one or more processors to command an actuator coupled to the flight control surface to move the flight control surface based on the forced oscillation signal.

Figure 1:
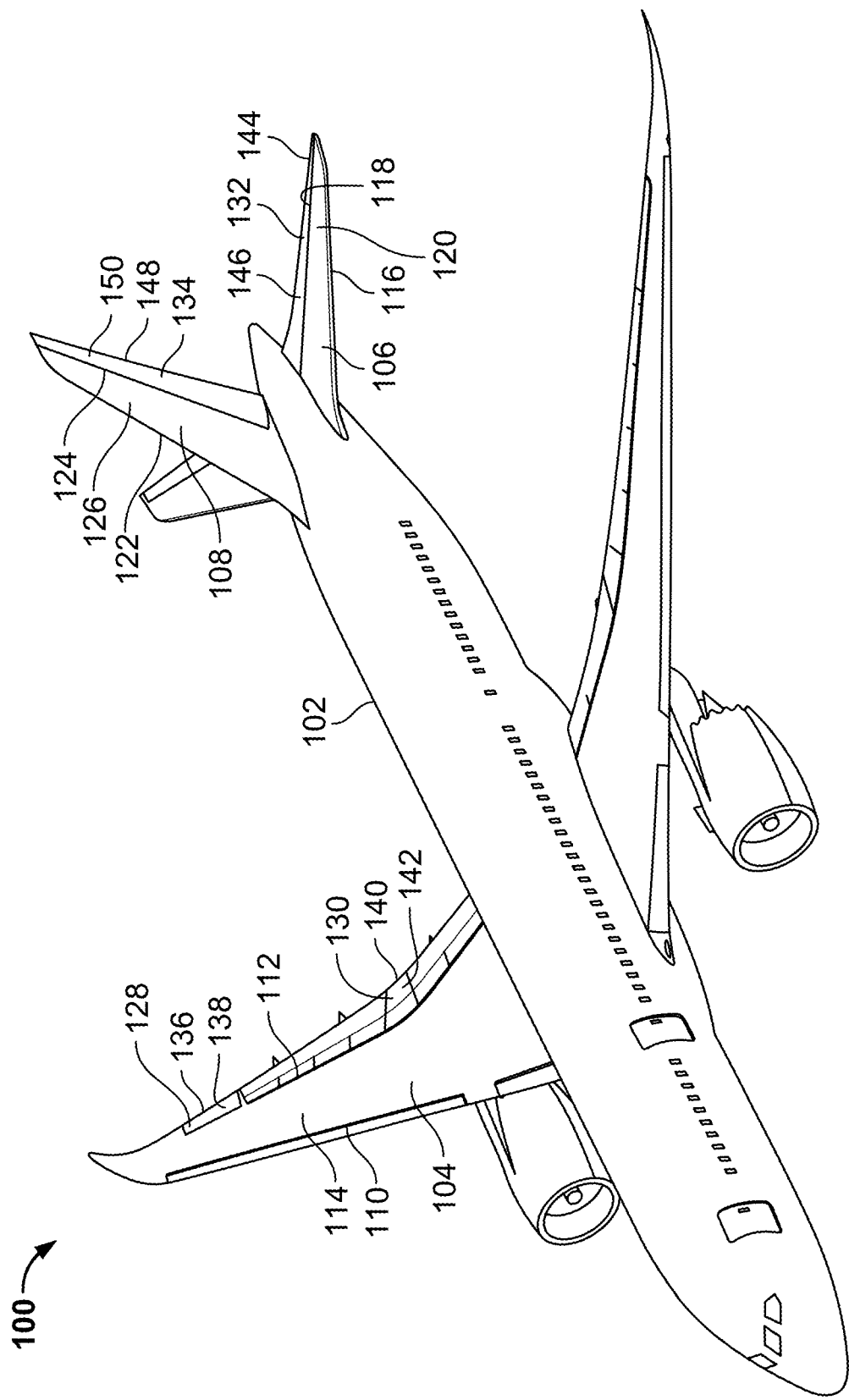
FIG. 1 is a perspective view of an example aircraft having example flight control surfaces.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third."

In such instances, it should be understood that such descriptors are used merely for ease of referencing multiple elements or components.

DETAILED DESCRIPTION

In conventional implementations, the aerodynamic effectiveness of each flight control surface of an aircraft typically decreases near the boundaries and/or extremes of the deflection range of the flight control surface. Reduction of flight control surface effectiveness is caused by local airflow separation that occurs as the angle of the flight control surface relative to the direction of the local airflow increases. Such reduction of flight control surface effectiveness can adversely limit the maneuverability of the aircraft in pitch, roll, and/or yaw. In some instances, the extent and/or magnitude of the local airflow separation can be severe enough to stall the aircraft. Once the aircraft stalls, the flight control surfaces of the aircraft effectively cease producing the forces and moments required for controlled flight. The control and/or stabilizing functions provided by the flight control surfaces of the aircraft are accordingly lost, thereby resulting in aircraft performance degradation or, at worst, loss of aircraft control.

In some conventional implementations, the deflection range of each flight control surface of an aircraft is adjusted and/or set to physical actuation limits that typically correspond to deflected positions of the flight control surface at which the limits of aerodynamic effectiveness of the flight control surface are reached. Control laws (e.g., implemented by one or more control system(s) of the aircraft) are then configured to operate the actuator(s) of each flight control surface within its/their physical actuation limits to prevent overdriving the flight control surface, wherein such overdriving could adversely reduce control and/or stability of the aircraft. Operational limits are then placed on the aircraft to prevent loss of control function. Even so, laboratory and flight test analyses are required to quantify the effects of flight control surface stall, and to develop recovery techniques and/or solutions configured to counteract such flight control surface stall.

Methods and apparatus for enhancing aircraft flight control surface effectiveness via forced oscillation are disclosed herein. As used herein, the term "forced oscillation" refers to machine-signaled and/or machine-commanded oscillation of an object (e.g., a flight control surface, and/or an actuator mechanically coupled to the flight control surface), as opposed to natural oscillation of the object that may occur in response to one or more local airflow(s) surrounding the object.

Unlike the conventional implementations described above, methods and apparatus disclosed herein generate one or more forced oscillation signal(s) in response to the position of the flight control surface exceeding a position threshold associated with the boundaries and/or extremes of the deflection range of the flight control surface. The forced oscillation signal(s) cause and/or command an actuator to oscillate (e.g., move with a regular, repeating alternation of direction) the flight control surface. Forced oscillation of the flight control surface advantageously generates dynamic lift as the limits of conventional static lift of the flight control surface are reached. Such dynamic lift can advantageously increase the aerodynamic effectiveness of the flight control surface by fifty percent (50%) or more beyond conventional static lift maximums. The methods and apparatus disclosed herein can accordingly increase aircraft maneuverability, obviate loss of aircraft control, improve flight path departure prevention, and quicken recovery from unusual flight conditions.

FIG. 1 is a perspective view of an example aircraft 100 having example flight control surfaces. The aircraft 100 of FIG. 1 includes an example fuselage 102, an example wing 104, an example horizontal stabilizer 106, and an example vertical stabilizer 108. In the illustrated example of FIG. 1, the wing 104, the horizontal stabilizer 106, and the vertical stabilizer 108 are respectively coupled to the fuselage 102. In other examples, the aircraft 100 can have a wing configuration and/or a stabilizer configuration which differ(s) from that shown in FIG. 1. In this regard, the aircraft 100 of FIG. 1 can be implemented by and/or as any type and/or form of aircraft having at least one flight control surface.

The wing 104 of FIG. 1 includes an example fixed leading edge 110, an example fixed trailing edge 112 located opposite to and/or rearward of the fixed leading edge 110, and an example fixed upper surface 114 extending between the fixed leading edge 110 and the fixed trailing edge 112. The horizontal stabilizer 106 of FIG. 1 includes an example fixed leading edge 116, an example fixed trailing edge 118 located opposite to and/or rearward of the fixed leading edge 116, and an example fixed upper surface 120 extending between the fixed leading edge 116 and the fixed trailing edge 118. The vertical stabilizer 108 of FIG. 1 includes an example fixed leading edge 122, an example fixed trailing edge 124 located opposite to and/or rearward of the fixed leading edge 122, and an example fixed vertical surface 126 extending between the fixed leading edge 122 and the fixed trailing edge 124.

In the illustrated example of FIG. 1, the flight control surfaces of the aircraft 100 include an example aileron 128 movably coupled to the wing 104, an example flaperon 130 movably coupled to the wing 104, an example elevator 132 movably coupled to the horizontal stabilizer 106, and an example rudder 134 movably coupled to the vertical stabilizer 108. The flight control surfaces (e.g., the aileron 128, the flaperon 130, the elevator 132, and the rudder 134) of the aircraft 100 of FIG. 1 individually and/or collectively provide flight control (e.g., roll control, pitch control, and/or yaw control) for the aircraft 100 of FIG. 1.

The aileron 128 of FIG. 1 is movably coupled to the wing 104 of the aircraft 100, and is located adjacent the fixed trailing edge 112 and/or the fixed upper surface 114 of the wing 104. The aileron 128 includes an example leading edge (not visible in FIG. 1), an example trailing edge 136 located opposite to and/or rearward of the leading edge, and an example upper surface 138 extending between the leading edge and the trailing edge 136. The aileron 128 is movable (e.g., rotatable and/or deflectable) relative to the fixed upper surface 114 of the wing 104 between a neutral (e.g., undeflected) position in which the upper surface 138 of the aileron 128 is generally aligned with (e.g., is parallel to and/or coplanar with) the fixed upper surface 114 of the wing 104, and a range of deflected positions in which the upper surface 138 of the aileron 128 is deflected (e.g., about a hinge line located proximate to the leading edge and/or forward of the trailing edge 136 of the aileron 128) upward or downward relative to the fixed upper surface 114 of the wing 104. Movement (e.g., rotation and/or deflection) of the aileron 128 relative to the wing 104 occurs via one or more actuator(s) coupled to the aileron 128 and the wing 104, with the actuator(s) being controlled via a control system of the aircraft 100.

The flaperon 130 of FIG. 1 is movably coupled to the wing 104 of the aircraft 100, and is located adjacent the fixed trailing edge 112 and/or the fixed upper surface 114 of the wing 104. The flaperon 130 includes an example leading edge (not visible in FIG. 1), an example trailing edge 140 located opposite to and/or rearward of the leading edge, and an example upper surface 142 extending between the leading edge and the trailing edge 140. The flaperon 130 is movable (e.g., rotatable and/or deflectable) relative to the fixed upper surface 114 of the wing 104 between a neutral (e.g., undeflected) position in which the upper surface 142 of the flaperon 130 is generally aligned with (e.g., is parallel to and/or coplanar with) the fixed upper surface 114 of the wing 104, and a range of deflected positions in which the upper surface 142 of the flaperon 130 is deflected (e.g., about a hinge line located proximate to the leading edge and/or forward of the trailing edge 140 of the flaperon 130) upward or downward relative to the fixed upper surface 114 of the wing 104. Movement (e.g., rotation and/or deflection) of the flaperon 130 relative to the wing 104 occurs via one or more actuator(s) coupled to the flaperon 130 and the wing 104, with the actuator(s) being controlled via a control system of the aircraft 100.

The elevator 132 of FIG. 1 is movably coupled to the horizontal stabilizer 106 of the aircraft 100, and is located adjacent the fixed trailing edge 118 and/or the fixed upper surface 120 of the horizontal stabilizer 106. The elevator 132 includes an example leading edge (not visible in FIG. 1), an example trailing edge 144 located opposite to and/or rearward of the leading edge, and an example upper surface 146 extending between the leading edge and the trailing edge 144. The elevator 132 is movable (e.g., rotatable and/or deflectable) relative to the fixed upper surface 120 of the horizontal stabilizer 106 between a neutral (e.g., undeflected) position in which the upper surface 146 of the elevator 132 is generally aligned with (e.g., is parallel to and/or coplanar with) the fixed upper surface 120 of the horizontal stabilizer 106, and a range of deflected positions in which the upper surface 146 of the elevator 132 is deflected (e.g., about a hinge line located proximate to the leading edge and/or forward of the trailing edge 144 of the elevator 132) upward or downward relative to the fixed upper surface 120 of the horizontal stabilizer 106. Movement (e.g., rotation and/or deflection) of the elevator 132 relative to the horizontal stabilizer 106 occurs via one or more actuator(s) coupled to the elevator 132 and the horizontal stabilizer 106, with the actuator(s) being controlled via a control system of the aircraft 100.

The rudder 134 of FIG. 1 is movably coupled to the vertical stabilizer 108 of the aircraft 100, and is located adjacent the fixed trailing edge 124 and/or the fixed vertical surface 126 of the vertical stabilizer 108. The rudder 134 includes an example leading edge (not visible in FIG. 1), an example trailing edge 148 located opposite to and/or rearward of the leading edge, and an example vertical surface 150 extending between the leading edge and the trailing edge 148. The rudder 134 is movable (e.g., rotatable and/or deflectable) relative to the fixed vertical surface 126 of the vertical stabilizer 108 between a neutral (e.g., undeflected) position in which the vertical surface 150 of the rudder 134 is generally aligned with (e.g., is parallel to and/or coplanar with) the fixed vertical surface 126 of the vertical stabilizer 108, and a range of deflected positions in which the vertical surface 150 of the rudder 134 is deflected (e.g., about a hinge line located proximate to the leading edge and/or forward of the trailing edge 148 of the rudder 134) leftward or rightward relative to the fixed vertical surface 126 of the vertical stabilizer 108. Movement (e.g., rotation and/or deflection) of the rudder 134 relative to the vertical stabilizer 108 occurs via one or more actuator(s) coupled to the rudder 134 and the vertical stabilizer 108, with the actuator(s) being controlled via a control system of the aircraft 100.

Figure 2:
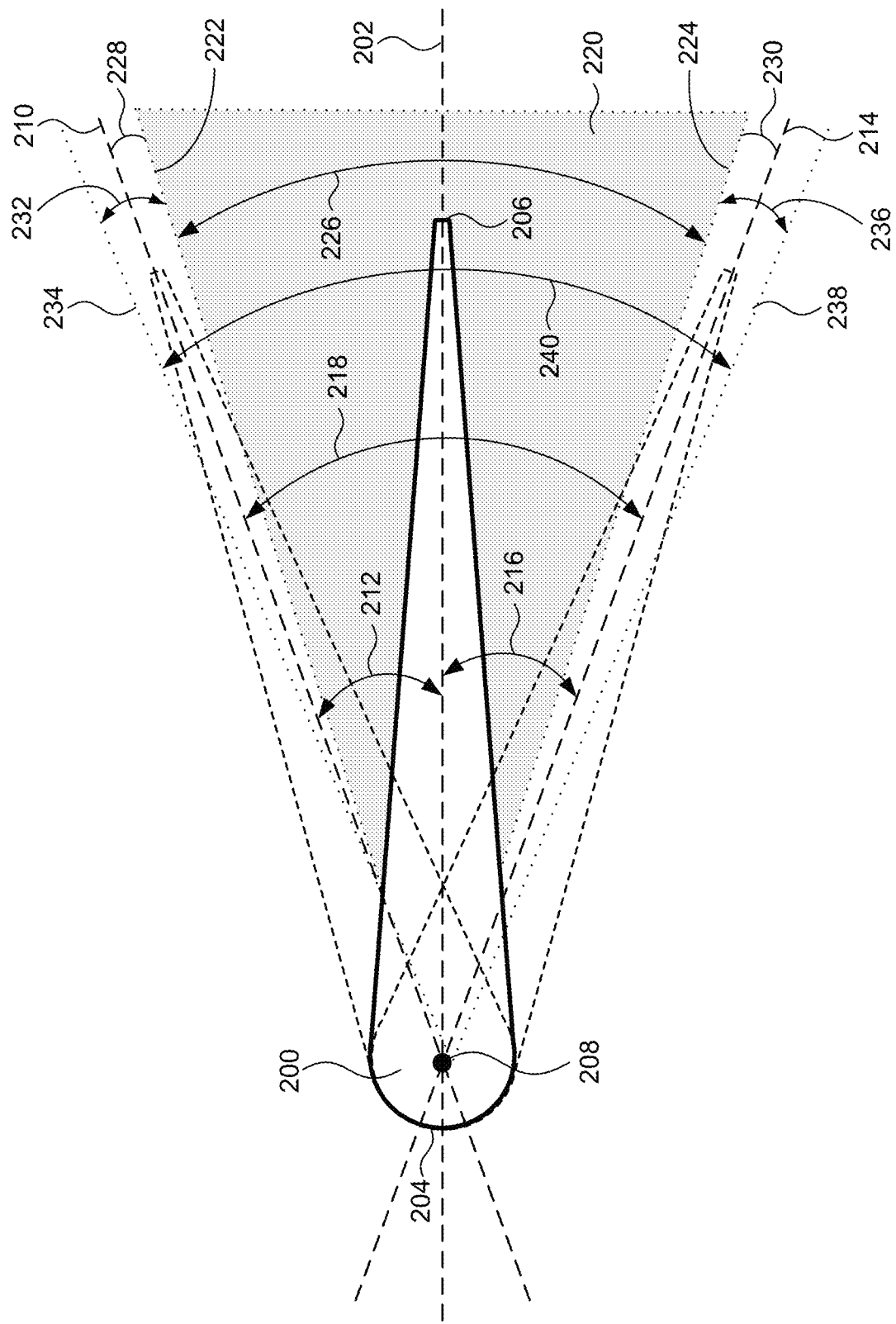
FIG. 2 is a cross-sectional view of an example flight control surface positioned in an example neutral position 202.

FIG. 2 is a cross-sectional view of an example flight control surface 200 positioned in an example neutral (e.g., undeflected) position 202. In some examples, the neutral position 202 shown in FIG. 2 is a reference position of the flight control surface 200 of FIG. 2. The flight control surface 200 of FIG. 2 can be implemented by and/or as any flight control surface that is movably coupled to another structure (e.g., a wing, a horizontal stabilizer, a vertical stabilizer, etc.) of an aircraft, including without limitation the example aircraft 100 of FIG. 1. For example, the flight control surface 200 of FIG. 2 can be implemented by and/or as any of the aileron 128 movably coupled to the wing 104 of the aircraft 100 of FIG. 1, the flaperon 130 movably coupled to the wing 104 of the aircraft 100 of FIG. 1, the elevator 132 movably coupled to the horizontal stabilizer 106 of the aircraft 100 of FIG. 1, or the rudder 134 movably coupled to the vertical stabilizer 108 of the aircraft 100 of FIG. 1. Use of the terms "upward" and "downward" in the description of FIG. 2 below are particularly applicable to the flight control surface 200 of FIG. 2 being implemented as an aileron, a flaperon, or an elevator. When the flight control surface 200 of FIG. 2 is instead implemented by a rudder, the terms "upward" and "downward" as used herein should instead respectively be interpreted as "rightward" and "leftward" or vice-versa.

In the illustrated example of FIG. 2, the flight control surface 200 includes an example leading edge 204 and an example trailing edge 206 located opposite the leading edge 204. The flight control surface 200 is movable (e.g., rotatable and/or deflectable relative to the neutral position 202) about an example hinge line 208. For example, as shown in FIG. 2, the flight control surface 200 is movable from the neutral position 202 to an example maximum static upward position 210 defined by an example maximum static upward angle 212, and/or to an example maximum static downward position 214 defined by an example maximum static downward angle 216. The maximum static upward position 210 and the maximum static downward position 214 collectively define an example maximum static deflection range 218 of the flight control surface 200. In some examples, the maximum static upward position 210 and the maximum static downward position 214 correspond to deflected positions of the flight control surface 200 of FIG. 2 at which the limits of aerodynamic effectiveness of the flight control surface 200 are conventionally reached (e.g., in the absence of forced oscillation of the flight control surface 200, as further described herein).

In the illustrated example of FIG. 2, the maximum static upward angle 212 is approximately twenty degrees (20°), the maximum static downward angle 216 is approximately twenty degrees (20°), and the maximum static deflection range 218 is approximately forty degrees (40°). In other examples, the maximum static upward angle 212 of FIG. 2 can be greater than or less than twenty degrees (20°), the maximum static downward angle 216 of FIG. 2 can be greater than or less than twenty degrees (20°), and/or the maximum static deflection range 218 of FIG. 2 can be greater than or less than forty degrees (40°). Moreover, while the illustrated example of FIG. 2 depicts the maximum static downward angle 216 as being approximately equal to the maximum static upward angle 212, in other examples the maximum static downward angle 216 can differ from the maximum static upward angle 212.

The flight control surface 200 of FIG. 2 is configured to be moved beyond the maximum static upward position 210, beyond the maximum static downward position 214, and/or beyond the maximum static deflection range 218 of FIG. 2 based on one or more forced oscillation signal(s) generated in response to the position of the flight control surface 200 exceeding a position threshold associated with the maximum static upward position 210, the maximum static downward position 214, and/or the maximum static deflection range 218. For example, FIG. 2 further illustrates an example position threshold 220 having an example upward boundary 222 and an example downward boundary 224 that collectively define an example threshold deflection range 226. As shown in FIG. 2, the threshold deflection range 226 is located within the maximum static deflection range 218. More specifically, the upward boundary 222 of the threshold deflection range 226 is spaced inwardly (e.g., toward the neutral position 202) from the maximum static upward position 210 by an example upward threshold angle 228, and the downward boundary 224 of the threshold deflection range 226 is spaced inwardly (e.g., toward the neutral position 202) from the maximum static downward position 214 by an example downward threshold angle 230.

In some examples, the upward threshold angle 228 and the downward threshold angle 230 are respectively five degrees (5.0° degrees) or less. In the illustrated example of FIG. 2, the upward threshold angle 228 is approximately two and one-half degrees (2.5°), the downward threshold angle 230 is approximately two and one-half degrees (2.5°), and the threshold deflection range 226 is approximately thirty-five degrees (35°). In other examples, the upward threshold angle 228 of FIG. 2 can be greater than or less than two and one-half degrees (2.5°), the downward threshold angle 230 of FIG. 2 can be greater than or less than two and one-half degrees (2.5°), and/or the threshold deflection range 226 of FIG. 2 can be greater than or less than thirty-five degrees (35°), all while the threshold deflection range 226 of FIG. 2 remains less than the maximum static deflection range 218 of FIG. 2. Moreover, while the illustrated example of FIG. 2 depicts the downward threshold angle 230 as being approximately equal to the upward threshold angle 228, in other examples the downward threshold angle 230 can differ from the upward threshold angle 228.

When the position of the flight control surface 200 of FIG. 2 exceeds the position threshold 220 and/or the threshold deflection range 226 of FIG. 2, one or more forced oscillation signal(s) cause the flight control surface 200 to be oscillated. For example, the flight control surface 200 of FIG. 2 can be oscillated over an example upward oscillation range 232 located between the upward boundary 222 of the position threshold 220 of FIG. 2 and an example maximum dynamic upward position 234, and/or over an example downward oscillation range 236 located between the downward boundary 224 of the position threshold 220 of FIG. 2 and an example maximum dynamic downward position 238. The maximum dynamic upward position 234 and the maximum dynamic downward position 238 collectively define an example maximum dynamic deflection range 240 of the flight control surface 200 of FIG. 2. As shown in FIG. 2, the maximum dynamic deflection range 240 of the flight control surface 200 exceeds and/or spans beyond the maximum static deflection range 218 of the flight control surface 200.

In some examples, the upward oscillation range 232 and the downward oscillation range 236 are respectively between two degrees (2.0°) and ten degrees (10.0° degrees). In the illustrated example of FIG. 2, the upward oscillation range 232 is approximately five degrees (5°), the downward oscillation range 236 is approximately five degrees (5°), and the maximum dynamic deflection range 240 is approximately forty-five degrees (45°). In other examples, the upward oscillation range 232 of FIG. 2 can be greater than or less than five degrees (5°), the downward oscillation range 236 of FIG. 2 can be greater than or less than five degrees (5°), and/or the maximum dynamic deflection range 240 of FIG. 2 can be greater than or less than forty-five degrees (45°), all while the maximum static deflection range 218 of FIG. 2 remains less than the maximum dynamic deflection range 240 of FIG. 2. Moreover, while the illustrated example of FIG. 2 depicts the downward oscillation range 236 as being approximately equal to the upward oscillation range 232, in other examples the downward oscillation range 236 can differ from the upward oscillation range 232.

Figure 3:
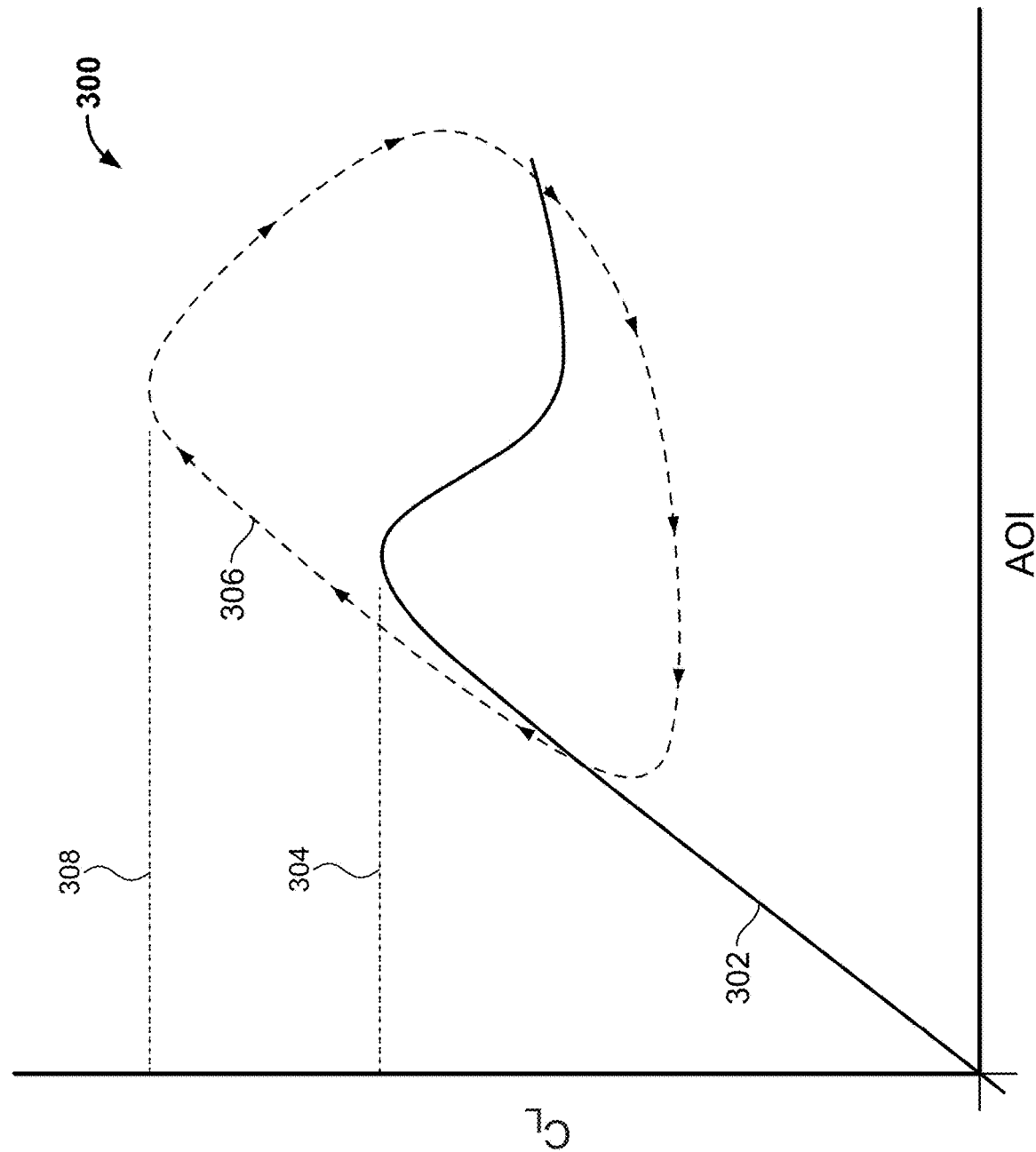
FIG. 3 is an example graph of lift coefficient ($C_L$) as a function of angle of incidence (AOI) for the flight control surface of FIG. 2.

Forced oscillation of the flight control surface 200 of FIG. 2 advantageously generates dynamic lift as the limits of conventional static lift of the flight control surface 200 of FIG. 2 are reached. For example, FIG. 3 is an example graph 300 of lift coefficient ($C_L$) as a function of angle of incidence (AOI) for the flight control surface 200 of FIG. 2. A first example plot 302 of the graph 300 illustrates conventional movement of the flight control surface 200 of FIG. 2, and a first example maximum lift 304 associated therewith. A second example plot 306 of the graph 300 illustrates oscillation of the flight control surface 200 of FIG. 2, and a second example maximum lift 308 associated therewith. In the illustrated example of FIG. 3, the first maximum lift 304 corresponds to the maximum static lift of the flight control surface 200 of FIG. 2, and the second maximum lift 308 corresponds to the maximum dynamic lift of the flight control surface 200 of FIG. 2. As shown in FIG. 3, the second maximum lift 308 exceeds the first maximum lift 304 by approximately fifty percent (50%). Such increased lift can increase aircraft maneuverability, obviate loss of aircraft control, improve flight path departure prevention, and quicken recovery from unusual flight conditions.

Figure 4:
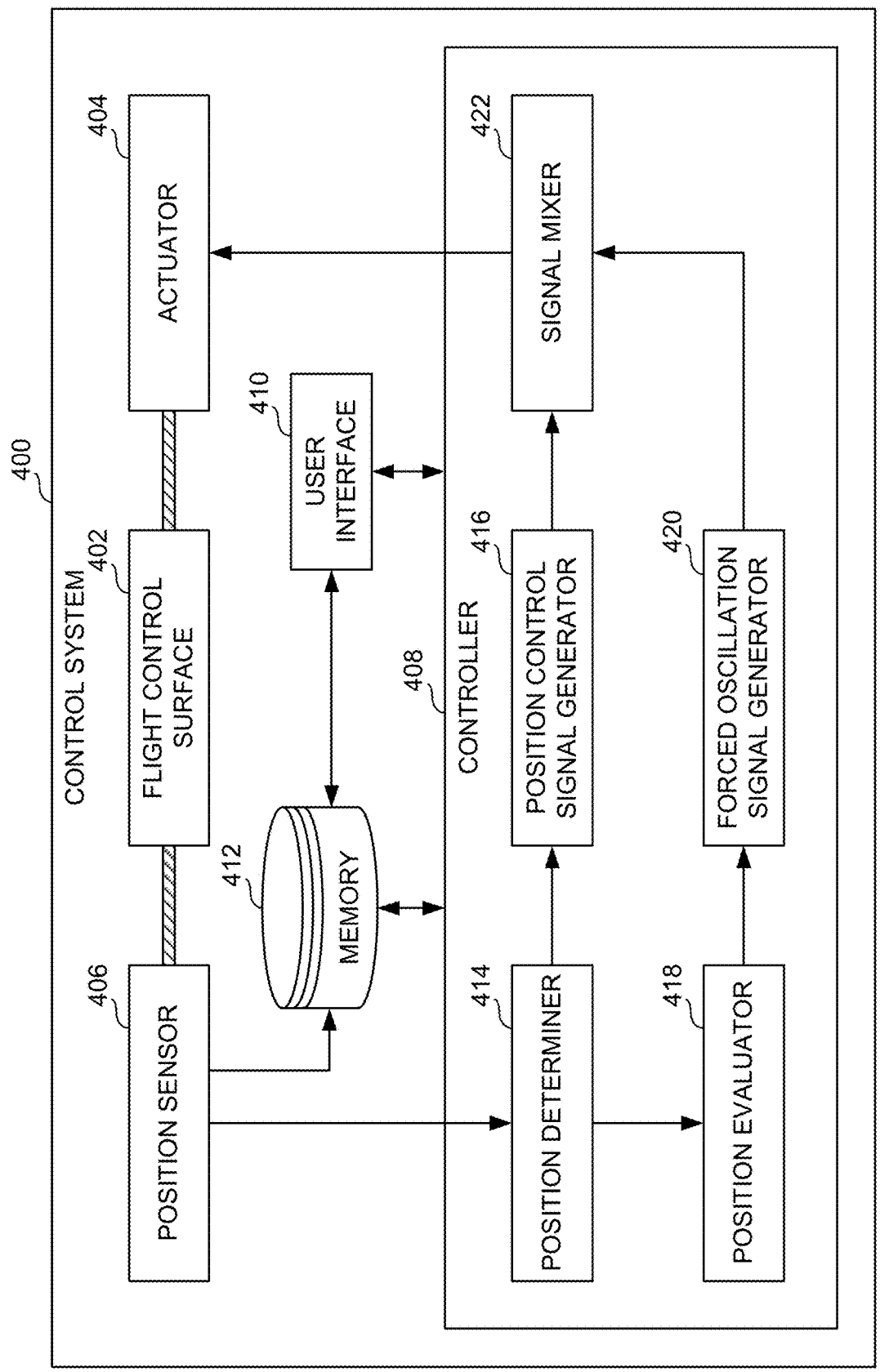
FIG. 4 is a block diagram of an example control system constructed in accordance with teachings of this disclosure.

FIG. 4 is a block diagram of an example control system 400 constructed in accordance with teachings of this disclosure. The control system 400 of FIG. 4 is configured to enhance the effectiveness of a flight control surface via forced oscillation. In the illustrated example of FIG. 4, the control system 400 includes an example flight control surface 402, an example actuator 404, an example position sensor 406, an example controller 408, an example user interface 410, and an example memory 412. The controller 408 of FIG. 4 includes an example position determiner 414, an example position control signal generator 416, an example position evaluator 418, an example forced oscillation signal generator 420, and an example signal mixer 422. However, other example implementations of the control system 400 of FIG. 4 may include fewer or additional structures.

In the illustrated example of FIG. 4, the actuator 404 is mechanically coupled to the flight control surface 402 and operatively coupled to the controller 408. The position sensor 406 is mechanically coupled to the flight control surface 402 and/or the actuator 404, and is operatively coupled to the controller 408 and the memory 412. The controller 408 is operatively coupled to the actuator 404, the position sensor 406, the user interface 410, and the memory 412. The user interface 410 is operatively coupled to the controller 408 and the memory 412. The memory 412 is operatively coupled to the position sensor 406, the controller 408, and the user interface 410. However, other example implementations of the control system 400 of FIG. 4 may include fewer or additional mechanical and/or operative couplings between and/or among the structures of the control system 400.

The flight control surface 402 of FIG. 4 can be implemented by and/or as any flight control surface that is movably coupled to another structure (e.g., a wing, a horizontal stabilizer, a vertical stabilizer, etc.) of an aircraft, including without limitation the example aircraft 100 of FIG. 1. For example, the flight control surface 402 of the control system 400 can be implemented by and/or as any of the aileron 128 movably coupled to the wing 104 of the aircraft 100 of FIG. 1, the flaperon 130 movably coupled to the wing 104 of the aircraft 100 of FIG. 1, the elevator 132 movably coupled to the horizontal stabilizer 106 of the aircraft 100 of FIG. 1, or the rudder 134 movably coupled to the vertical stabilizer 108 of the aircraft 100 of FIG. 1. Moreover, the flight control surface 402 of FIG. 4 can be implemented by and/or as the flight control surface 200 of FIG. 2 described above.

The actuator 404 of FIG. 4 can be implemented by and/or as any type(s) and/or any number(s) of actuator(s) configured to fit partially and/or fully within and/or on an aircraft structure (e.g., the wing 104, the horizontal stabilizer 106, and/or the vertical stabilizer 108 of the aircraft 100 of FIG. 1) to which the flight control surface 402 of FIG. 4 is movably coupled, and further configured to move (e.g., rotate, deflect, and/or oscillate) the flight control surface 402 of FIG. 4 over a desired and/or specified range of positions. For example, the actuator 404 of FIG. 4 can be located (e.g., partially or fully located) within and/or on the wing 104, the horizontal stabilizer 106, and/or the vertical stabilizer 108 the aircraft 100 of FIG. 1, and may include portions and/or components located within and/or on the fuselage 102 of the aircraft 100 of FIG. 1.

In some examples, the actuator 404 of FIG. 4 can be implemented by and/or as an electro-mechanical actuation system that includes one or more electronic component(s). In other examples, the actuator 404 of FIG. 4 can be implemented by and/or as a hydro-mechanical actuation system that includes one or more hydraulic component(s). In still other examples, the actuator 404 of FIG. 4 can be implemented by and/or as a pneumatic-mechanical actuation system that includes one or more pneumatic component(s). The actuator 404 of FIG. 4 can include any type(s) and/or number(s) of mechanical components including, for example, any type(s) and/or any number(s) of motors, valves, gears, clutches, latches, pistons, rods, shafts, links, pulleys, chains, belts, hinges, pins, biasing elements, shape memory alloys, etc.

The position sensor 406 of FIG. 4 can be located on the flight control surface 402 of FIG. 4, and/or on the actuator 404 of FIG. 4. The position sensor 406 of FIG. 4 senses and/or detects the position (e.g., the angular position) of the flight control surface 402 of FIG. 4 relative to a reference position (e.g., a reference angular position) of the flight control surface 402. For example, the position sensor 406 of FIG. 4 can sense and/or detect the position of the flight control surface 200 of FIG. 2, within the maximum static deflection range 218 of FIG. 2 and/or within the maximum dynamic deflection range 240 of FIG. 2, relative to the neutral position 202 of FIG. 2. In some examples, the position sensor 406 of FIG. 4 continuously senses and/or continuously detects the position of the flight control surface 402. In other examples, the position sensor 406 of FIG. 4 periodically senses and/or periodically detects the position of the flight control surface 402 based on a timing interval and/or a sampling frequency implemented via the controller 408 of FIG. 4.

Position data sensed and/or detected by the position sensor 406 of FIG. 4 can be of any quantity, type, form and/or format, and can be stored in the memory 412 of FIG. 4. Position data sensed and/or detected by the position sensor 406 of FIG. 4 can be accessed by the position determiner 414 of FIG. 4 and/or, more generally, by the controller 408 of FIG. 4, either from the memory 412 of FIG. 4, or directly from the position sensor 406.

The controller 408 of FIG. 4 manages and/or controls the operation of the actuator 404 of FIG. 4 and/or the movement (e.g., rotation, deflection and/or oscillation) of the flight control surface 402 of FIG. 4, including without limitation managing and/or controlling the operation of the actuator 404 and/or the movement of the flight control surface 402 to enhance the effectiveness of the flight control surface 402 via forced oscillation. The controller 408 of FIG. 4 can be located on and/or within any portion of the aircraft 100 of FIG. 1 (e.g., on and/or within the fuselage 102, the wing 104, the horizontal stabilizer 106, the vertical stabilizer 108, etc.). In the illustrated example of FIG. 4, the controller 408 includes the position determiner 414, the position control signal generator 416, the position evaluator 418, the forced oscillation signal generator 420, and the signal mixer 422 of FIG. 4, each of which is discussed in further detail herein. The position determiner 414, the position control signal generator 416, the position evaluator 418, the forced oscillation signal generator 420, the signal mixer 422, and/or, more generally, the controller 408 of FIG. 4 can individually and/or collectively be implemented by any type(s) and/or any number(s) of semiconductor device(s) (e.g., microprocessor(s), microcontroller(s), etc.) and/or circuit(s).

The position determiner 414 of the controller 408 of FIG. 4 determines and/or identifies the current (e.g., the most recent) position of the flight control surface 402 of FIG. 4 based on the most-recently available position data sensed and/or detected by the position sensor 406 of FIG. 4. For example, the position determiner 414 of FIG. 4 can determine and/or identify the current position of the flight control surface 200 of FIG. 2, within the maximum static deflection range 218 of FIG. 2 and/or within the maximum dynamic deflection range 240 of FIG. 2, based on the most recent position data that is available to the position determiner 414.

In the illustrated example of FIG. 4, the position determiner 414 determines and/or identifies the current position of the flight control surface 402 by accessing, obtaining, and/or receiving current (e.g., the most-recently sensed and/or detected) position data directly from the position sensor 406 of FIG. 4. In other examples, the position determiner 414 can determine and/or identify the current position of the flight control surface 402 by accessing and/or obtaining current (e.g., the most-recently stored) position data from the memory 412 of FIG. 4.

Current position data determined, identified, processed, and/or output by and/or at the position determiner 414 of FIG. 4 can be of any quantity, type, form and/or format, and can be stored in the memory 412 of FIG. 4. Current position data determined, identified, processed, and/or output by the position determiner 414 of FIG. 4 can be accessed by the position control signal generator 416 and/or by the position evaluator 418 of FIG. 4 and/or, more generally, by the controller 408 of FIG. 4, either from the memory 412 of FIG. 4, or directly from the position determiner 414.

The position control signal generator 416 of the controller 408 of FIG. 4 generates a position control signal that is configured to cause the actuator 404 of FIG. 4 to move (e.g., rotate and/or deflect) the flight control surface 402 of FIG. 4 from its current position to a target position. For example, the position control signal generator 416 of FIG. 4 can generate a position control signal that is configured to cause the actuator 404 of FIG. 4 to move (e.g., rotate and/or deflect) the flight control surface 200 of FIG. 2 from its current position (e.g., within the maximum static deflection range 218 of FIG. 2 and/or within the maximum dynamic deflection range 240 of FIG. 2) to a target position (e.g., within the maximum static deflection range 218 of FIG. 2).

The position control signal generated by the position control signal generator 416 of FIG. 4 is based in part on the current position of the flight control surface 402 of FIG. 4. In the illustrated example of FIG. 4, the position control signal generator 416 and/or, more generally, the controller 408 of FIG. 4 accesses, obtains, and/or receives current position data directly from the position determiner 414 of FIG. 4. In other examples, the position control signal generator 416 and/or, more generally, the controller 408 of FIG. 4 can access and/or obtain current position data from the memory 412 of FIG. 4.

The position control signal generated by the position control signal generator 416 of FIG. 4 is/are also based in part on the target position of the flight control surface 402 of FIG. 4. In the illustrated example of FIG. 4, the position control signal generator 416 and/or, more generally, the controller 408 of FIG. 4 determines and/or identifies the target position of the flight control surface 402 based on one or more target position data input(s), signal(s), and/or command(s) obtained and/or received from the user interface 410 of FIG. 4. In other examples, the position control signal generator 416 and/or, more generally, the controller 408 of FIG. 4 can determine and/or identify the target position of the flight control surface 402 by accessing and/or obtaining stored and/or preprogrammed target position data from the memory 412 of FIG. 4.

Position control signal data generated, processed, and/or output by and/or at the position determiner 414 of FIG. 4 can be of any quantity, type, form and/or format, and can be stored in the memory 412 of FIG. 4. Position control signal data generated, processed, and/or output by the position control signal generator 416 of FIG. 4 can be accessed by the signal mixer 422 of FIG. 4 and/or, more generally, by the controller 408 of FIG. 4, either from the memory 412 of FIG. 4, or directly from the position control signal generator 416.

The position evaluator 418 of the controller 408 of FIG. 4 determines whether the current position of the flight control surface 402 of FIG. 4 exceeds a position threshold. The position threshold can include an upward boundary that is not to be exceeded, a downward boundary that is not to be exceeded, and/or a threshold deflection range having both an upward boundary and a downward boundary that are not to be exceeded. For example, the position evaluator 418 of FIG. 4 can determine and/or detect whether the current position of the flight control surface 200 of FIG. 2 exceeds the position threshold 220 of FIG. 2, as defined by the upward boundary 222, the downward boundary 224, and/or the threshold deflection range 226 of the position threshold 220.

In the illustrated example of FIG. 4, the position evaluator 418 determines and/or detects whether the current position of the flight control surface 402 exceeds the position threshold by accessing, obtaining, and/or receiving current position data directly from the position determiner 414 of FIG. 4, and further by comparing such current position data to the position threshold which can either be stored at the position evaluator 418 itself or accessed by the position evaluator 418 from the memory 412 of FIG. 4. In other examples, the position evaluator 418 determines and/or detects whether the current position of the flight control surface 402 exceeds the position threshold by accessing and/or obtaining current position data from the memory 412 of FIG. 4, and further by comparing such current position data to the position threshold which can either be stored at the position evaluator 418 itself or accessed by the position evaluator 418 from the memory 412 of FIG. 4.

Position threshold data and/or position evaluation data accessed, invoked, determined, generated, processed, and/or output by and/or at the position evaluator 418 of FIG. 4 can be of any quantity, type, form and/or format, and can be stored in the memory 412 of FIG. 4. Position threshold data and/or position evaluation data accessed, invoked, determined, generated, processed, and/or output by and/or at the position evaluator 418 of FIG. 4 can be accessed by the forced oscillation signal generator 420 of FIG. 4 and/or, more generally, by the controller 408 of FIG. 4, either from the memory 412 of FIG. 4, or directly from the position evaluator 418.

The forced oscillation signal generator 420 of the controller 408 of FIG. 4 generates a forced oscillation signal that is configured to cause the actuator 404 of FIG. 4 to oscillate the flight control surface 402 of FIG. 4. For example, the forced oscillation signal generator 420 of FIG. 4 can generate a forced oscillation signal that is configured to cause the actuator 404 of FIG. 4 to oscillate the flight control surface 200 of FIG. 2 within the upward oscillation range 232 of FIG. 2, or within the downward oscillation range 236 of FIG. 2. In some examples, the forced oscillation signal generated by the forced oscillation signal generator 420 of FIG. 4 is a sinusoidal waveform that is configured to cause the actuator 404 of FIG. 4 to move the flight control surface 402 of FIG. 4 with a regular, repeating alternation of direction. For example, the forced oscillation signal generated by the forced oscillation signal generator 420 of FIG. 4 can be a sinusoidal waveform that is configured to cause the actuator 404 of FIG. 4 to move the flight control surface 200 of FIG. 2 with a regular, repeating alternation of direction within the upward oscillation range 232 of FIG. 2, or within the downward oscillation range 236 of FIG. 2.

In some examples, the forced oscillation signal generated by the forced oscillation signal generator 420 of FIG. 4 is configured to cause the actuator 404 of FIG. 4 to oscillate the flight control surface 402 of FIG. 4 within an oscillation range relative to a maximum static position of the flight control surface 402. For example, the forced oscillation signal generated by the forced oscillation signal generator 420 of FIG. 4 can be configured to cause the actuator 404 of FIG. 4 to oscillate the flight control surface 200 of FIG. 2 within the upward oscillation range 232 of FIG. 2 relative to the maximum static upward position 210 of FIG. 2, or within the downward oscillation range 236 of FIG. 2 relative to the maximum static downward position 214 of FIG. 2. In some examples, the oscillation range is between two degrees (2.0°) and ten degrees (10.0° degrees) relative to the maximum static position of the flight control surface 402.

The forced oscillation signal generated by the position control signal generator 416 of FIG. 4 is based in part on the position evaluation data generated and/or output by the position evaluator 418 of FIG. 4. In the illustrated example of FIG. 4, the forced oscillation signal generator 420 and/or, more generally, the controller 408 of FIG. 4 accesses, obtains, and/or receives position evaluation data directly from the position evaluator 418 of FIG. 4. In other examples, the forced oscillation signal generator 420 and/or, more generally, the controller 408 of FIG. 4 can access and/or obtain position evaluation data from the memory 412 of FIG. 4.

In the illustrated example of FIG. 4, the operation and/or output of the forced oscillation signal generator 420 is dependent upon the nature of the position evaluation data generated and/or output by the position evaluator 418 of FIG. 4. In this regard, the forced oscillation signal generator 420 of FIG. 4 generates the forced oscillation signal described above in response to the position evaluation data generated and/or output by the position evaluator 418 of FIG. 4 indicating that the current position of the flight control surface 402 of FIG. 4 exceeds the position threshold. If the position evaluation data generated and/or output by the position evaluator 418 of FIG. 4 instead indicates that the current position of the flight control surface 402 of FIG. 4 does not exceed and/or no longer exceeds the position threshold, the forced oscillation signal generator 420 of FIG. 4 instead foregoes generating the forced oscillation signal, and/or terminates any previously-generated forced oscillation signal that may still be active.

Forced oscillation signal data generated, processed, and/or output by and/or at the forced oscillation signal generator 420 of FIG. 4 can be of any quantity, type, form and/or format, and can be stored in the memory 412 of FIG. 4. Forced oscillation signal data generated, processed, and/or output by the forced oscillation signal generator 420 of FIG. 4 can be accessed by the signal mixer 422 of FIG. 4 and/or, more generally, by the controller 408 of FIG. 4, either from the memory 412 of FIG. 4, or directly from the forced oscillation signal generator 420.

The signal mixer 422 of the controller 408 of FIG. 4 mixes (e.g., combines, sums, and/or convolves) the forced oscillation signal generated and/or output by the forced oscillation signal generator 420 of FIG. 4 with the position control signal concurrently generated and/or concurrently output by the position control signal generator 416 of FIG. 4. The output of the signal mixer 422 of FIG. 4 is accordingly dependent upon whether the forced oscillation signal generator 420 of FIG. 4 is generating and/or outputting a forced oscillation signal. If the position control signal generator 416 is generating and/or outputting a position control signal, and the forced oscillation signal generator 420 is not generating a forced oscillation signal, the signal mixer 422 responds by outputting the position control signal. If the position control signal generator 416 is generating and/or outputting a position control signal, and the forced oscillation signal generator 420 is concurrently generating and/or concurrently outputting a forced oscillation signal, the signal mixer 422 responds by generating and/or outputting a combined control signal that mixes (e.g., combines, sums, and/or convolves) the forced oscillation signal and the position control signal.

The signal mixer 422 of FIG. 4 commands the actuator 404 of FIG. 4 to move (e.g., rotate, deflect, and/or oscillate) the flight control surface 402 of FIG. 2 based on and/or according to the specific type of signal generated and/or output by the signal mixer 422. If the signal mixer 422 of FIG. 4 outputs a position control signal (e.g., isolated from any forced oscillation signal), the signal mixer 422 commands the actuator 404 to move (e.g., rotate and/or deflect) the flight control surface 402 based on and/or according to the position control signal. For example, the signal mixer 422 can command the actuator 404 to move (e.g., rotate and/or deflect) the flight control surface 200 of FIG. 2, within the threshold deflection range 226 of FIG. 2, based on and/or according to the position control signal. If the signal mixer 422 of FIG. 4 outputs a combined control signal (e.g., a position control signal mixed with a forced oscillation signal), the signal mixer 422 commands the actuator 404 to move (e.g., rotate, deflect, and/or oscillate) the flight control surface 402 based on and/or according to the combined control signal. For example, the signal mixer 422 can command the actuator 404 to move (e.g., rotate, deflect, and/or oscillate) the flight control surface 200 of FIG. 2, within the upward oscillation range 232 of FIG. 2 or within the downward oscillation range 236 of FIG. 2, based on and/or according to the combined control signal.

Position control signal data, forced oscillation signal data, and/or combined control signal data generated, processed, and/or output by and/or at the signal mixer 422 of FIG. 4 can be of any quantity, type, form and/or format, and can be stored in the memory 412 of FIG. 4. Position control signal data, forced oscillation signal data, and/or combined control signal data generated, processed, and/or output by the signal mixer 422 of FIG. 4 can be accessed by the controller 408 of FIG. 4, either from the memory 412 of FIG. 4, or directly from the signal mixer 422.

The user interface 410 of FIG. 4 facilitates interactions and/or communications between an end user (e.g., a pilot of an aircraft) and the control system 400. The user interface 410 includes one or more input device(s) via which the user may input information and/or data to the controller 408 of the control system 400. For example, the input device(s) may include a control lever, a button, a knob, a switch, a touchscreen, an audio sensor, a microphone, and/or a camera that enable(s) the user to convey data and/or commands to the controller 408 (including the position determiner 414, the position control signal generator 416, the position evaluator 418, the forced oscillation signal generator 420, and/or the signal mixer 422 of the controller 408) and/or the memory 412 of FIG. 4, and/or, more generally, to the control system 400 of FIG. 4. The user interface 410 of FIG. 4 also includes one or more output device(s) via which the user interface 410 presents information and/or data in visual and/or audible form to the user. For example, the output device(s) may include a light emitting diode, a touchscreen, and/or a liquid crystal display for presenting visual information, and/or a speaker for presenting audible information. Data and/or information that is received from and/or presented by the user interface 410 of FIG. 4 may be of any quantity, type, form and/or format, and may be stored in a computer-readable storage medium such as the example memory 412 of FIG. 4 described below.

The memory 412 of FIG. 4 can be implemented by any type(s) and/or any number(s) of storage device(s) such as a storage drive, a flash memory, a read-only memory (ROM), a random-access memory (RAM), a cache and/or any other physical storage medium in which information is stored for any duration (e.g., for extended time periods, permanently, brief instances, for temporarily buffering, and/or for caching of the information). The information stored in the memory 412 of FIG. 4 may be stored in any file and/or data structure format, organization scheme, and/or arrangement. The memory 412 of FIG. 4 is accessible to the position sensor 406, the controller 408 (including the position determiner 414, the position control signal generator 416, the position evaluator 418, the forced oscillation signal generator 420, and the signal mixer 422 of FIG. 4), and/or the user interface 410 of FIG. 4, and/or, more generally, to the control system 400 of FIG. 4.

In some examples, the memory 412 of FIG. 4 stores position data sensed, measured, and/or detected by the position sensor 406 of FIG. 4, and/or current position data accessed, obtained, determined, processed, and/or generated by and/or at the position determiner 414 of the controller 408 of FIG. 4. In some examples, the memory 412 of FIG. 4 stores position control signal data processed and/or generated by and/or at the position control signal generator 416 of the controller 408 of FIG. 4. In some examples, the memory 412 of FIG. 4 stores position evaluation data accessed, obtained, determined, processed, and/or generated by and/or at the position evaluator 418 of the controller 408 of FIG. 4. In some examples, the memory 412 of FIG. 4 stores forced oscillation signal data processed and/or generated by and/or at the forced oscillation signal generator 420 of the controller 408 of FIG. 4. In some examples, the memory 412 of FIG. 4 stores combined control signal data processed and/or generated by and/or at the signal mixer 422 of the controller 408 of FIG. 4, and/or combined control signal data output and/or transmitted to the actuator 404 of FIG. 4. In some examples, the memory 412 of FIG. 4 stores data and/or information that is received from and/or presented by the user interface 410 of FIG. 2.

While an example manner of implementing the control system 400 is illustrated in FIG. 4, one or more of the elements, processes and/or devices illustrated in FIG. 4 may be combined, divided, re-arranged, omitted, eliminated and/or implemented in any other way. Further, the example flight control surface 402, the example actuator 404, the example position sensor 406, the example controller 408, the example user interface 410, the example memory 412, the example position determiner 414, the example position control signal generator 416, the example position evaluator 418, the example forced oscillation generator 420, and the example signal mixer 422, and/or, more generally, the example control system 400 of FIG. 4 may be implemented by hardware, software, firmware and/or any combination of hardware, software and/or firmware. Thus, for example, any of the example position sensor 406, the example controller 408, the example user interface 410, the example memory 412, the example position determiner 414, the example position control signal generator 416, the example position evaluator 418, the example forced oscillation generator 420, and the example signal mixer 422, and/or, more generally, the example control system 400 of FIG. 4 could be implemented by one or more analog or digital circuit(s), logic circuit(s), programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example position sensor 406, the example controller 408, the example user interface 410, the example memory 412, the example position determiner 414, the example position control signal generator 416, the example position evaluator 418, the example forced oscillation generator 420, and the example signal mixer 422, and/or, more generally, the example control system 400 of FIG. 4 is/are hereby expressly defined to include a non-transitory computer-readable storage device or storage disk such as a memory, a digital versatile disk (DVD), a compact disk (CD), a Blu-ray disk, etc. including the software and/or firmware. Further still, the example flight control surface 402, the example actuator 404, the example position sensor 406, the example controller 408, the example user interface 410, the example memory 412, the example position determiner 414, the example position control signal generator 416, the example position evaluator 418, the example forced oscillation generator 420, and the example signal mixer 422, and/or, more generally, the example control system 400 of FIG. 4 may include one or more element(s), process(es) and/or device(s) in addition to, or instead of, those illustrated in FIG. 4, and/or may include more than one of any or all of the illustrated elements, processes and devices. As used herein, the phrase "in communication," including variations thereof, encompasses direct communication and/or indirect communication through one or more intermediary component(s), and does not require direct physical (e.g., wired) communication and/or constant communication, but rather additionally includes selective communication at periodic intervals, scheduled intervals, aperiodic intervals, and/or one-time events.

Figure 5:
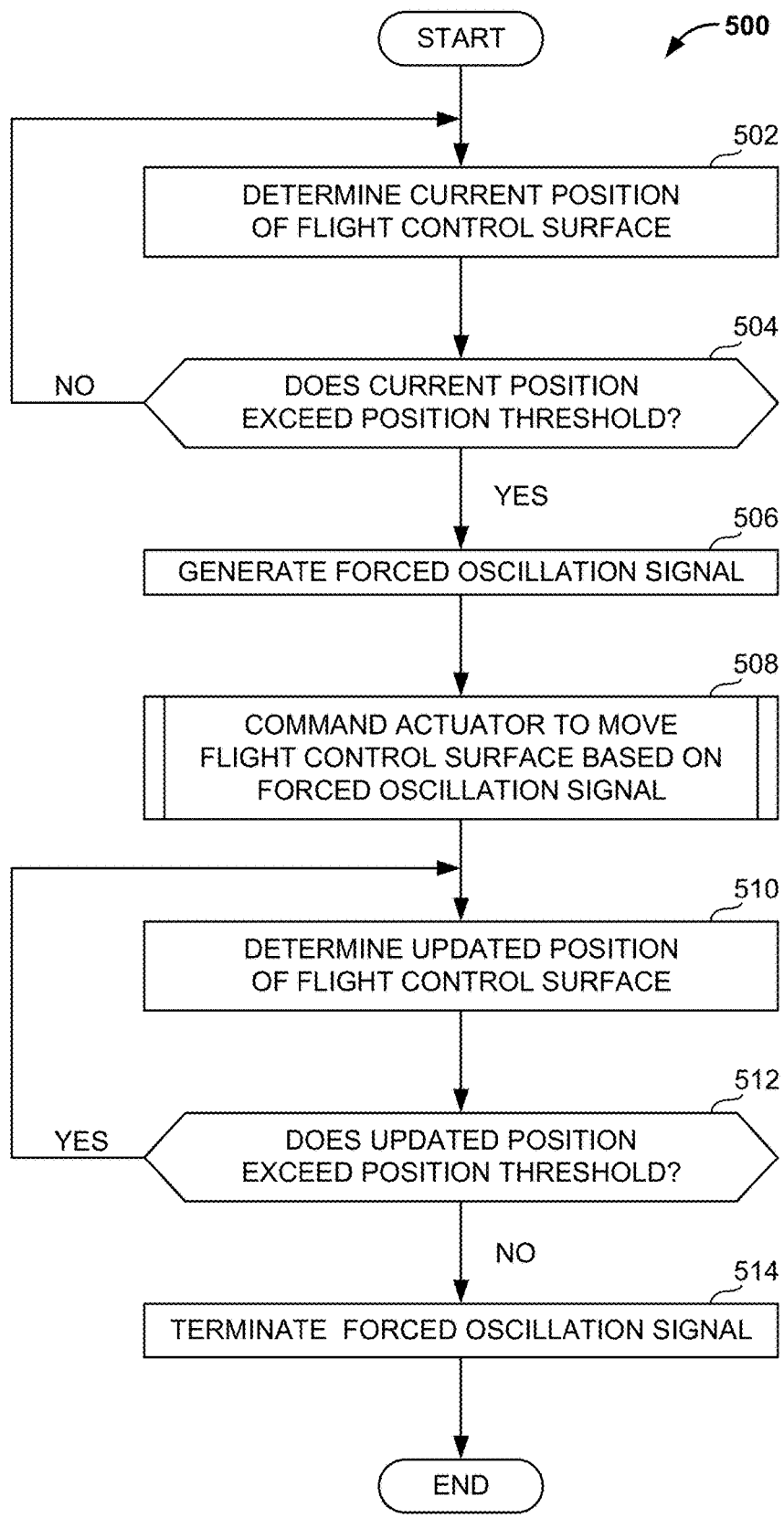
FIG. 5 is a flowchart representative of example machine-readable instructions that may be executed to implement the control system of FIG. 4 to enhance the effectiveness of a flight control surface via forced oscillation.
Figure 6:
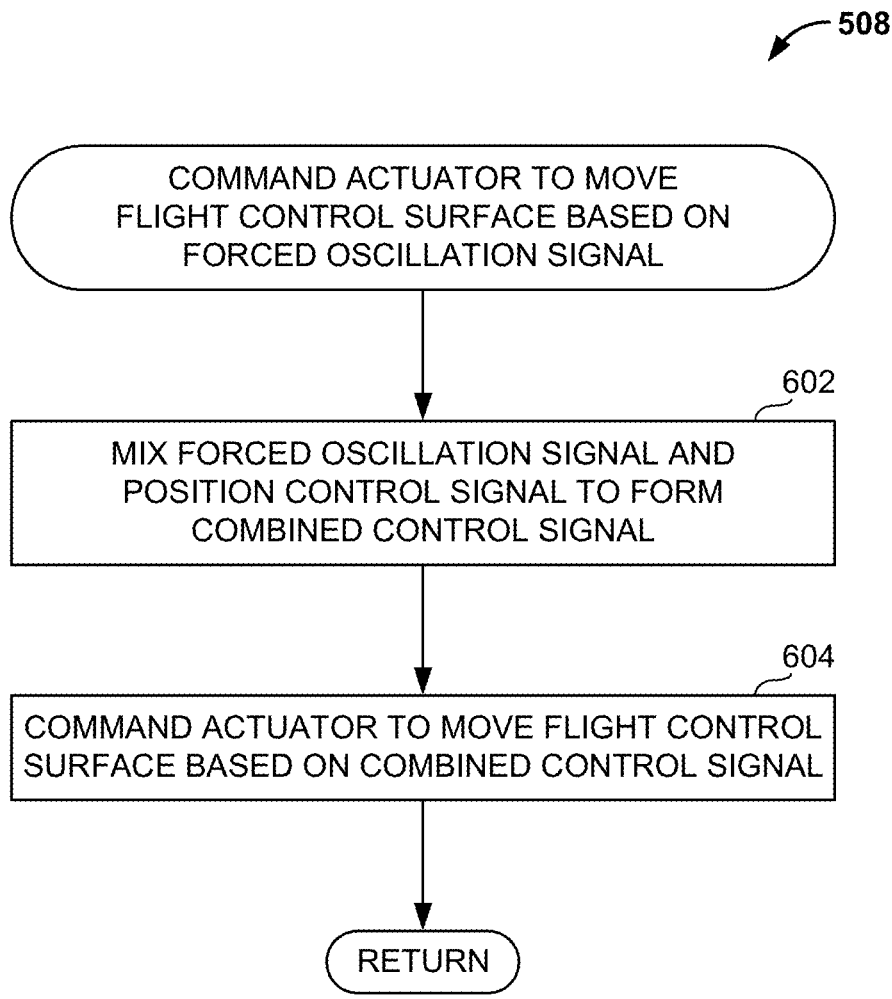
FIG. 6 is a flowchart representative of example machine-readable instructions that may be executed to implement the control system of FIG. 4 to command an actuator to move a flight control surface via forced oscillation.

Flowcharts representative of example hardware logic, machine-readable instructions, hardware implemented state machines, and/or any combination thereof for implementing the control system 400 of FIG. 4 are shown in FIGS. 5 and 6. The machine-readable instructions may be one or more executable program(s) or portion(s) of executable program(s) for execution by a computer processor such as the example processor 702 shown in the example processor platform 700 discussed below in connection with FIG. 7. The program(s) may be embodied in software stored on a non-transitory computer-readable storage medium such as a CD-ROM, a floppy disk, a hard drive, a DVD, a Blu-ray disk, or a memory associated with the processor 702, but the entire program(s) and/or parts thereof could alternatively be executed by a device other than the processor 702 and/or embodied in firmware or dedicated hardware. Further, although the example program(s) is/are described with reference to the flowcharts illustrated in FIGS. 5 and 6, many other methods of implementing the example control system 400 of FIG. 4 may alternatively be used. For example, the order of execution of the blocks may be changed, and/or some of the blocks described may be changed, eliminated, or combined. Additionally or alternatively, any or all of the blocks may be implemented by one or more hardware circuit(s) (e.g., discrete and/or integrated analog and/or digital circuitry, a field-programmable gate array (FPGA), an ASIC, a comparator, an operational-amplifier (op-amp), a logic circuit, etc.) structured to perform the corresponding operation without executing software or firmware.

The machine-readable instructions described herein may be stored in one or more of a compressed format, an encrypted format, a fragmented format, a packaged format, etc. Machine-readable instructions as described herein may be stored as data (e.g., portions of instructions, code, representations of code, etc.) that may be utilized to create, manufacture, and/or produce machine-executable instructions. For example, the machine-readable instructions may be fragmented and stored on one or more storage device(s) and/or computing device(s) (e.g., servers). The machine-readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine-readable instructions may be stored in multiple parts, which are individually compressed, encrypted, and stored on separate computing devices, wherein the parts when decrypted, decompressed, and combined form a set of executable instructions that implement a program such as that described herein. In another example, the machine-readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, the disclosed machine-readable instructions and/or corresponding program(s) are intended to encompass such machine-readable instructions and/or program(s) regardless of the particular format or state of the machine-readable instructions and/or program(s) when stored or otherwise at rest or in transit.

As mentioned above, the example processes of FIGS. 5 and 6 may be implemented using executable instructions (e.g., computer and/or machine-readable instructions) stored on a non-transitory computer and/or machine-readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term "non-transitory computer-readable medium" is expressly defined to include any type of computer-readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

FIG. 5 is a flowchart representative of example machine-readable instructions (e.g. program) 500 that may be executed to implement the example control system 400 of FIG. 4 to enhance the effectiveness of a flight control surface via forced oscillation. The example program 500 of FIG. 5 begins when the example position determiner 414 and/or, more generally, the example controller 408 of FIG. 4 determines a current position of the example flight control surface 402 of FIG. 4 (block 502). For example, the position determiner 414 of FIG. 4 can determine and/or identify a current position of the flight control surface 200 of FIG. 2, within the maximum static deflection range 218 of FIG. 2 and/or within the maximum dynamic deflection range 240 of FIG. 2, based on the most recent position data that is available to the position determiner 414, either directly from the position sensor 406 of FIG. 4, or from the memory 412 of FIG. 4. Following block 502, control of the example program 500 of FIG. 5 proceeds to block 504.

At block 504, the example position evaluator 418 and/or, more generally, the example controller 408 of FIG. 4 determines whether the current position of the example flight control surface 402 of FIG. 4 exceeds a position threshold. The position threshold can include an upward boundary that is not to be exceeded, a downward boundary that is not to be exceeded, and/or a threshold deflection range having both an upward boundary and a downward boundary that are not to be exceeded. For example, the position evaluator 418 of FIG. 4 can determine and/or detect whether the current position of the flight control surface 200 of FIG. 2 exceeds the position threshold 220 of FIG. 2, as defined by the upward boundary 222, the downward boundary 224, and/or the threshold deflection range 226 of the position threshold 220. If the position evaluator 418 determines at block 504 that the current position of the flight control surface 402 does not exceed the position threshold, control of the example program 500 of FIG. 5 returns to block 502. If the position evaluator 418 instead determines at block 504 that the current position of the flight control surface 402 exceeds the position threshold, control of the example program 500 of FIG. 5 proceeds to block 506.

At block 506, the example forced oscillation signal generator 420 and/or, more generally, the example controller 408 of FIG. 4 generates a forced oscillation signal. For example, the forced oscillation signal generator 420 of FIG. 4 can generate a forced oscillation signal that is configured to cause the actuator 404 of FIG. 4 to oscillate the flight control surface 200 of FIG. 2 within the upward oscillation range 232 of FIG. 2, or within the downward oscillation range 236 of FIG. 2. In some examples, the forced oscillation signal is configured to cause the actuator 404 of FIG. 4 to move the flight control surface 402 of FIG. 4 with a regular, repeating alternation of direction. For example, the forced oscillation signal can be a sinusoidal waveform that is configured to cause the actuator 404 of FIG. 4 to move the flight control surface 200 of FIG. 2 with a regular, repeating alternation of direction within the upward oscillation range 232 of FIG. 2, or within the downward oscillation range 236 of FIG. 2. In some examples, the forced oscillation signal is configured to cause the actuator 404 of FIG. 4 to oscillate the flight control surface 402 of FIG. 4 within an oscillation range relative to a maximum static position of the flight control surface 402. For example, the forced oscillation signal can be configured to cause the actuator 404 of FIG. 4 to oscillate the flight control surface 200 of FIG. 2 within the upward oscillation range 232 of FIG. 2 relative to the maximum static upward position 210 of FIG. 2, or within the downward oscillation range 236 of FIG. 2 relative to the maximum static downward position 214 of FIG. 2. Following block 506, control of the example program 500 of FIG. 5 proceeds to block 508.

At block 508, the example signal mixer 422 and/or, more generally, the example controller 408 of FIG. 4 commands the example actuator 404 of FIG. 4 to move (e.g., rotate, deflect, and/or oscillate) the example flight control surface 402 of FIG. 4 based on and/or according to the forced oscillation signal. An example process that may be used to implement block 508 of the example program 500 of FIG. 5 is described in greater detail below in connection with FIG. 6. Following block 508, control of the example program 500 of FIG. 5 proceeds to block 510.

At block 510, the example position determiner 414 and/or, more generally, the example controller 408 of FIG. 4 determines an updated position of the example flight control surface 402 of FIG. 4. For example, the position determiner 414 of FIG. 4 can determine and/or identify an updated position (e.g., a subsequent current position relative to the current position previously determined at block 502 of the example program of FIG. 5) of the flight control surface 200 of FIG. 2, within the maximum static deflection range 218 of FIG. 2 and/or within the maximum dynamic deflection range 240 of FIG. 2, based on the most recent position data that is available to the position determiner 414, either directly from the position sensor 406 of FIG. 4, or from the memory 412 of FIG. 4. Following block 510, control of the example program 500 of FIG. 5 proceeds to block 512.

At block 512, the example position evaluator 418 and/or, more generally, the example controller 408 of FIG. 4 determines whether the updated position of the example flight control surface 402 of FIG. 4 exceeds the position threshold. For example, the position evaluator 418 of FIG. 4 can determine and/or detect whether the updated position of the flight control surface 200 of FIG. 2 exceeds the position threshold 220 of FIG. 2, as defined by the upward boundary 222, the downward boundary 224, and/or the threshold deflection range 226 of the position threshold 220. If the position evaluator 418 determines at block 512 that the updated position of the flight control surface 402 exceeds the position threshold, control of the example program 500 of FIG. 5 returns to block 510. If the position evaluator 418 instead determines at block 512 that the updated position of the flight control surface 402 does not exceed the position threshold, control of the example program 500 of FIG. 5 proceeds to block 514.

At block 514, the example forced oscillation signal generator 420 and/or, more generally, the example controller 408 of FIG. 4 terminates the forced oscillation signal. For example, the forced oscillation signal generator 420 can terminate the forced oscillation signal previously generated by the forced oscillation signal generator 420 at block 506 of the example program 500 of FIG. 5. Following block 514, the example program 500 of FIG. 5 ends.

FIG. 6 is a flowchart representative of example machine-readable instructions (e.g. program) 508 that may be executed to implement the example control system 400 of FIG. 4 to command an actuator to move a flight control surface via forced oscillation. Example operations of blocks 602 and 604 of FIG. 6 may be used to implement block 508 of FIG. 5. The example program 508 of FIG. 6 begins when the example signal mixer 422 and/or, more generally, the example controller 408 of FIG. 4 mixes the forced oscillation signal and a position control signal to form a combined control signal (block 602). For example, the signal mixer 422 of FIG. 4 can mix (e.g., combine, sum, and/or convolve) the forced oscillation signal generated and/or output (e.g., at block 506) by the forced oscillation signal generator 420 of FIG. 4 and a position control signal concurrently generated and/or concurrently output by the position control signal generator 416 of FIG. 4 to form a combined control signal. Following block 604, control of the example program 508 of FIG. 6 proceeds to block 604.

At block 604, the example signal mixer 422 and/or, more generally, the example controller 408 of FIG. 4 commands the example actuator 404 of FIG. 4 to move (e.g., rotate, deflect, and/or oscillate) the example flight control surface 402 of FIG. 4 based on and/or according to the combined control signal. For example, the signal mixer 422 of FIG. 4 can output and/or transmit the combined control signal to the actuator 404 of FIG. 4 to command the actuator 404 to move (e.g., rotate, deflect, and/or oscillate) the flight control surface 200 of FIG. 2, within the upward oscillation range 232 of FIG. 2 and/or within the downward oscillation range 236 of FIG. 2, based on and/or according to the combined control signal. Following block 604, control of the example program 508 of FIG. 6 returns to a function call such as block 508 of the example program 500 of FIG. 5.

Figure 7:
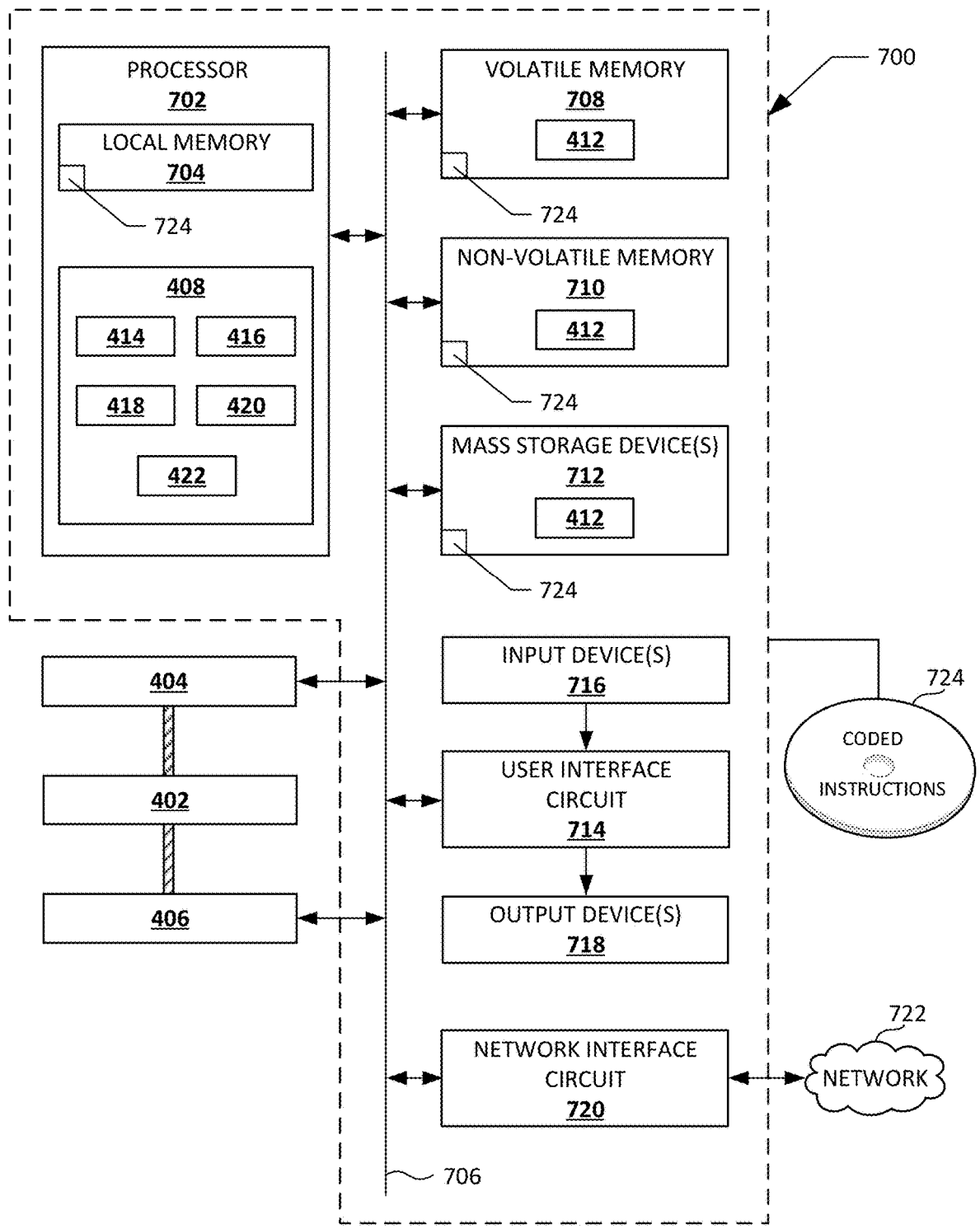
FIG. 7 is a block diagram of an example processor platform structured to execute the machine-readable instructions of FIGS. 5 and 6 to implement the control system of FIG. 4.

FIG. 7 is a block diagram of an example processor platform 700 structured to execute the example machine-readable instructions (e.g. programs) 500, 508 of FIGS. 5 and 6 to implement the example control system 400 of FIG. 4. The processor platform 700 of the illustrated example includes a processor 702. The processor 702 of the illustrated example is hardware. For example, the processor 702 can be implemented by one or more integrated circuit(s), logic circuit(s), microprocessor(s), GPU(s), DSP(s), microcontroller(s), processor(s), or microcontroller(s) from any desired family or manufacturer. The hardware processor may be a semiconductor based (e.g., silicon based) device. In this example, the processor 702 implements the example controller 408 of FIG. 4, including the example position determiner 414, the example position control signal generator 416, the example position evaluator 418, the example forced oscillation signal generator 420, and example signal mixer 422 of the controller 408 of FIG. 4.

The processor 702 of the illustrated example includes a local memory 704 (e.g., a cache). The processor 702 is in communication with the example actuator 404 and the example position sensor 406 of FIG. 4 via a bus 706. The processor 702 is also in communication with a main memory including a volatile memory 708 and a non-volatile memory 710 via the bus 706. The volatile memory 708 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 710 may be implemented by flash memory and/or any other desired type of memory device. Access to the main memory 708, 710 is controlled by a memory controller.

The processor platform 700 of the illustrated example also includes one or more mass storage device(s) 712 for storing software and/or data. Examples of such mass storage device(s) 712 include floppy disk drives, hard drive disks, compact disk drives, Blu-ray disk drives, redundant array of independent disks (RAID) systems, and digital versatile disk (DVD) drives. In the illustrated example of FIG. 7, one or more of the volatile memory 708, the non-volatile memory 710, and/or the mass storage device(s) 712 implement(s) the example memory 412 of FIG. 4.

The processor platform 700 of the illustrated example also includes a user interface circuit 714. The user interface circuit 714 may be implemented by any type of interface standard, such as an Ethernet interface, a universal serial bus (USB), a Bluetooth® interface, a near field communication (NFC) interface, and/or a peripheral component interconnect (PCI) express interface. In the illustrated example, one or more input device(s) 716 are connected to the user interface circuit 714. The input device(s) 716 permit(s) a user (e.g., a pilot of an aircraft) to enter data and/or commands into the processor 702. The input device(s) 16 can be implemented by, for example, a control lever, a button, a knob, a switch, a touchscreen, an audio sensor, a microphone, and/or a camera. One or more output device(s) 718 are also connected to the user interface circuit 714 of the illustrated example. The output device(s) 718 can be implemented, for example, by a display device (e.g., a light emitting diode (LED), an organic light emitting diode (OLED), a liquid crystal display (LCD), a touchscreen, etc.), a tactile output device, and/or a speaker. The user interface circuit 714 of the illustrated example, thus, typically includes a graphics driver card, a graphics driver chip and/or a graphics driver processor. In the illustrated example of FIG. 7, the user interface circuit 714, the input device(s) 716, and the output device(s) 718 collectively implement the example user interface 410 of FIG. 4.

The processor platform 700 of the illustrated example also includes a network interface circuit 720. The network interface circuit 720 may be implemented by any type of interface standard, such as an Ethernet interface, a universal serial bus (USB), a Bluetooth® interface, a near field communication (NFC) interface, and/or a PCI express interface. The network interface circuit 720 may include a radio transmitter, a radio receiver, and/or a radio transceiver to facilitate the exchange of data and/or signals with external machines (e.g., a server, a computing device, etc.) via a network 722 (e.g., a controller area network (CAN), a local area network (LAN), a wireless local area network (WLAN), a cellular network, etc.).

Coded instructions 724 including the example machine-readable instructions 500, 508 of FIGS. 5 and 6 may be stored in the local memory 704, in the volatile memory 708, in the non-volatile memory 710, on the mass storage device(s) 712, and/or on a removable non-transitory computer-readable storage medium such as a flash memory stick, a CD, or a DVD.

From the foregoing, it will be appreciated that the above-disclosed methods and apparatus advantageously enhance the effectiveness of aircraft flight control surfaces via forced oscillation. The disclosed methods and apparatus generate one or more forced oscillation signal(s) in response to the position of the flight control surface exceeding a position threshold associated with the boundaries and/or extremes of the deflection range of the flight control surface. The forced oscillation signal(s) cause and/or command an actuator to oscillate (e.g., move with a regular, repeating alternation of direction) the flight control surface. Forced oscillation of the flight control surface advantageously generates dynamic lift as the limits of conventional static lift of the flight control surface are reached. Such dynamic lift can advantageously increase the aerodynamic effectiveness of the flight control surface by fifty percent (50%) or more beyond conventional static lift maximums. The disclosed methods and apparatus can accordingly increase aircraft maneuverability, obviate loss of aircraft control, improve flight path departure prevention, and quicken recovery from unusual flight conditions.

The following paragraphs provide various examples of the examples disclosed herein.

Example 1 includes a control system of an aircraft. The control system of Example 1 comprises a flight control surface, an actuator, and one or more processors. The actuator is configured to move the flight control surface. The one or more processors are configured to determine a current position of the flight control surface. The one or more processors are further configured to determine whether the current position exceeds a position threshold. The one or more processors are further configured to generate a forced oscillation signal in response to determining that the current position exceeds the position threshold. The one or more processors are further configured to command the actuator to move the flight control surface based on the forced oscillation signal.

Example 2 includes the control system of Example 1, wherein the flight control surface is an aileron, a flaperon, an elevator, or a rudder.

Example 3 includes the control system of any of Examples 1-2, wherein the position threshold is within five degrees of a maximum static position of the flight control surface.

Example 4 includes the control system of any of Examples 1-3, wherein the forced oscillation signal has a sinusoidal waveform.

Example 5 includes the control system of any of Examples 1-4, wherein the forced oscillation signal is to increase a lift coefficient associated with the flight control surface.

Example 6 includes the control system of any of Examples 1-5, wherein the forced oscillation signal is to cause the actuator to oscillate the flight control surface by two to ten degrees relative to a maximum static position of the flight control surface.

Example 7 includes the control system of any of Examples 1-6, wherein the one or more processors are further configured to mix the forced oscillation signal and a position control signal to form a combined control signal. The one or more processors of Example 7 are further configured to command the actuator to move the flight control surface based on the combined control signal.

Example 8 includes the control system of any of Examples 1-7, wherein the one or more processors are further configured to determine an updated position of the flight control surface. The one or more processor of Example 8 are further configured to determine whether the updated position exceeds the position threshold. The one or more processors of Example 8 are further configured to terminate the forced oscillation signal in response to determining that the updated position does not exceed the position threshold.

Example 9 includes a method comprising determining, by executing a machine-readable instruction with one or more processors of an aircraft, a current position of a flight control surface of the aircraft. The method of Example 9 further comprises determining, by executing a machine-readable instruction with the one or more processors, whether the current position exceeds a position threshold. The method of Example 9 further comprises generating, by executing a machine-readable instruction with the one or more processors, a forced oscillation signal in response to determining that the current position exceeds the position threshold. The method of Example 9 further comprises commanding, by executing a machine-readable instruction with the one or more processors, an actuator coupled to the flight control surface to move the flight control surface based on the forced oscillation signal.

Example 10 includes the method of Example 9, wherein the flight control surface is an aileron, a flaperon, an elevator, or a rudder.

Example 11 includes the method of any of Examples 9-10, wherein the forced oscillation signal has a sinusoidal waveform.

Example 12 includes the method of any of Examples 9-11, wherein the forced oscillation signal causes the actuator to oscillate the flight control surface by two to ten degrees relative to a maximum static position of the flight control surface.

Example 13 includes the method of any of Examples 9-12, further comprising mixing, by executing a machine-readable instruction with the one or more processors, the forced oscillation signal and the position control signal to form a combined control signal. The method of Example 13 further comprises commanding, by executing a machine-readable instruction with the one or more processors, the actuator to move the flight control surface based on the combined control signal.

Example 14 includes the method of any of Examples 9-13, further comprising determining, by executing a machine-readable instruction with the one or more processors, an updated position of the flight control surface. The method of Example 14 further comprises determining, by executing a machine-readable instruction with the one or more processors, whether the updated position exceeds the position threshold. The method of example 14 further comprises terminating, by executing a machine-readable instruction with the one or more processors, the forced oscillation signal in response to determining that the updated position does not exceed the position threshold.

Example 15 includes a non-transitory computer-readable storage medium comprising instructions. When executed, the instructions of Example 15 cause one or more processors of a machine to determine a current position of a flight control surface of an aircraft. When executed, the instructions of Example 15 further cause the one or more processors to determine whether the current position exceeds a position threshold. When executed, the instructions of Example 15 further cause the one or more processors to generate a forced oscillation signal in response to determining that the current position exceeds the position threshold. When executed, the instructions of Example 15 further cause the one or more processors to command an actuator coupled to the flight control surface to move the flight control surface based on the forced oscillation signal.

Example 16 includes the non-transitory computer-readable storage medium of Examples 15, wherein the flight control surface is an aileron, a flaperon, an elevator, or a rudder.

Example 17 includes the non-transitory computer-readable storage medium of any of Examples 15-16, wherein the forced oscillation signal has a sinusoidal waveform.

Example 18 includes the non-transitory computer-readable storage medium of any of Examples 15-17, wherein the forced oscillation signal causes the actuator to oscillate the flight control surface by two to ten degrees relative to a maximum static position of the flight control surface.

Example 19 includes the non-transitory computer-readable storage medium of any of Examples 15-18, wherein the instructions, when executed, further cause the one or more processors to mix the forced oscillation signal and a position control signal to form a combined control signal. When executed, the instructions of Example 19 further cause the one or more processors to command the actuator to move the flight control surface based on the combined control signal.

Example 20 includes the non-transitory computer-readable storage medium of any of Examples 15-19, wherein the instructions, when executed, further cause the one or more processors to determine an updated position of the flight control surface. When executed, the instructions of Example 20 further cause the one or more processors to determine whether the updated position exceeds the position threshold. When executed, the instructions of Example further cause the one or more processors to terminate the forced oscillation signal in response to determining that the updated position does not exceed the position threshold.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A control system of an aircraft, the control system comprising:
    a flight control surface;
    an actuator configured to move the flight control surface; and
    one or more processors configured to:
        determine a current position of the flight control surface;
        determine whether the current position exceeds a position threshold;
        generate a forced oscillation signal in response to determining that the current position exceeds the position threshold; and
        command the actuator to move the flight control surface based on the forced oscillation signal.

2. The control system of claim 1, wherein the flight control surface is an aileron, a flaperon, an elevator, or a rudder.

3. The control system of claim 1, wherein the position threshold is within five degrees of a maximum static position of the flight control surface.

4. The control system of claim 1, wherein the forced oscillation signal has a sinusoidal waveform.

5. The control system of claim 1, wherein the forced oscillation signal is to increase a lift coefficient associated with the flight control surface.

6. The control system of claim 1, wherein the forced oscillation signal is to cause the actuator to oscillate the flight control surface by two to ten degrees relative to a maximum static position of the flight control surface.

7. The control system of claim 1, wherein the one or more processors are further configured to:
    mix the forced oscillation signal and a position control signal to form a combined control signal; and
    command the actuator to move the flight control surface based on the combined control signal.

8. The control system of claim 1, wherein the one or more processors are further configured to:
    determine an updated position of the flight control surface;
    determine whether the updated position exceeds the position threshold; and
    terminate the forced oscillation signal in response to determining that the updated position does not exceed the position threshold.

9. A method, comprising:
    determining, by executing a machine-readable instruction with one or more processors of an aircraft, a current position of a flight control surface of the aircraft;

determining, by executing a machine-readable instruction with the one or more processors, whether the current position exceeds a position threshold;

generating, by executing a machine-readable instruction with the one or more processors, a forced oscillation signal in response to determining that the current position exceeds the position threshold; and commanding, by executing a machine-readable instruction with the one or more processors, an actuator coupled to the flight control surface to move the flight control surface based on the forced oscillation signal.

10. The method of claim 9, wherein the flight control surface is an aileron, a flaperon, an elevator, or a rudder.

11. The method of claim 9, wherein the forced oscillation signal has a sinusoidal waveform.

12. The method of claim 9, wherein the forced oscillation signal causes the actuator to oscillate the flight control surface by two to ten degrees relative to a maximum static position of the flight control surface.

13. The method of claim 9, further comprising:
mixing, by executing a machine-readable instruction with the one or more processors, the forced oscillation signal and a position control signal to form a combined control signal; and commanding, by executing a machine-readable instruction with the one or more processors, the actuator to move the flight control surface based on the combined control signal.

14. The method of claim 9, further comprising:
determining, by executing a machine-readable instruction with the one or more processors, an updated position of the flight control surface;

determining, by executing a machine-readable instruction with the one or more processors, whether the updated position exceeds the position threshold; and terminating, by executing a machine-readable instruction with the one or more processors, the forced oscillation signal in response to determining that the updated position does not exceed the position threshold.

15. A non-transitory computer-readable storage medium comprising instructions that, when executed, cause one or more processors of a machine to at least:

determine a current position of a flight control surface of an aircraft;

determine whether the current position exceeds a position threshold;

generate a forced oscillation signal in response to determining that the current position exceeds the position threshold; and command an actuator coupled to the flight control surface to move the flight control surface based on the forced oscillation signal.

16. The non-transitory computer-readable storage medium of claim 15, wherein the flight control surface is an aileron, a flaperon, an elevator, or a rudder.

17. The non-transitory computer-readable storage medium of claim 15, wherein the forced oscillation signal has a sinusoidal waveform.

18. The non-transitory computer-readable storage medium of claim 15, wherein the forced oscillation signal causes the actuator to oscillate the flight control surface by two to ten degrees relative to a maximum static position of the flight control surface.

19. The non-transitory computer-readable storage medium of claim 15, wherein the instructions, when executed, cause the one or more processors to:

mix the forced oscillation signal and a position control signal to form a combined control signal; and command the actuator to move the flight control surface based on the combined control signal.

20. The non-transitory computer-readable storage medium of claim 15, wherein the instructions, when executed, cause the one or more processors to:

determine an updated position of the flight control surface;

determine whether the updated position exceeds the position threshold; and terminate the forced oscillation signal in response to determining that the updated position does not exceed the position threshold.

* * * * *